US012421862B2

(12) United States Patent
Freeman et al.

(10) Patent No.: US 12,421,862 B2
(45) Date of Patent: Sep. 23, 2025

(54) TURBINE SHROUD ASSEMBLY WITH ANGLED COOLING HOLES

(71) Applicant: Rolls-Royce Corporation, Indianapolis, IN (US)

(72) Inventors: Ted J. Freeman, Indianapolis, IN (US); Aaron D. Sippel, Indianapolis, IN (US); Clark Snyder, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/528,732

(22) Filed: Dec. 4, 2023

(65) Prior Publication Data

US 2025/0179928 A1 Jun. 5, 2025

(51) Int. Cl.
 *F01D 11/08* (2006.01)
 *F01D 25/12* (2006.01)
 *F01D 25/24* (2006.01)

(52) U.S. Cl.
 CPC .............. *F01D 11/08* (2013.01); *F01D 25/12* (2013.01); *F01D 25/246* (2013.01); *F05D 2240/11* (2013.01); *F05D 2260/201* (2013.01); *F05D 2300/6033* (2013.01)

(58) Field of Classification Search
 CPC .......................... F01D 25/246; F05D 2260/201
 See application file for complete search history.

(56) References Cited

U.S. PATENT DOCUMENTS

| 5,593,278 | A | * | 1/1997 | Jourdain | F01D 5/3053 |
| | | | | | 415/173.2 |
| 6,508,623 | B1 | * | 1/2003 | Shiozaki | F01D 25/246 |
| | | | | | 415/173.1 |
| 7,207,771 | B2 | | 4/2007 | Synnott et al. | |
| 7,217,089 | B2 | | 5/2007 | Durocher et al. | |
| 7,374,395 | B2 | | 5/2008 | Durocher et al. | |
| 7,513,740 | B1 | | 4/2009 | Hervy et al. | |
| 7,600,967 | B2 | | 10/2009 | Pezzetti, Jr. et al. | |
| 7,771,159 | B2 | | 8/2010 | Johnson et al. | |
| 7,901,186 | B2 | | 3/2011 | Cornett et al. | |
| 8,206,087 | B2 | | 6/2012 | Campbell et al. | |
| 8,303,245 | B2 | | 11/2012 | Foster et al. | |
| 8,641,371 | B2 | | 2/2014 | Nakamura et al. | |
| 8,651,497 | B2 | | 2/2014 | Tholen et al. | |
| 8,684,680 | B2 | | 4/2014 | Martin et al. | |
| 8,784,041 | B2 | | 7/2014 | Durocher et al. | |

(Continued)

FOREIGN PATENT DOCUMENTS

| EP | 1965031 A2 | 9/2008 |
| EP | 3543468 A1 | 9/2019 |
| FR | 3056636 A1 | 3/2018 |

*Primary Examiner* — Courtney D Heinle
*Assistant Examiner* — John S Hunter, Jr.
(74) *Attorney, Agent, or Firm* — Barnes & Thornburg

(57) ABSTRACT

An assembly adapted for use in a gas turbine engine includes a blade track segment, a carrier segment, and a retainer. The blade track segment defines a portion of a gas path of the gas turbine engine. The carrier segment supports the blade track segment to locate the blade track segment radially outward of the axis. The retainer couples the blade track segment to the carrier segment. The carrier segment may include a plurality of impingement passageways to conduct cooling air to the blade track segment.

20 Claims, 5 Drawing Sheets

(56) References Cited

U.S. PATENT DOCUMENTS

| | | |
|---|---|---|
| 8,845,285 B2 | 9/2014 | Weber et al. |
| 8,905,708 B2 | 12/2014 | Weber et al. |
| 9,079,245 B2 | 7/2015 | Durocher et al. |
| 9,534,500 B2 | 1/2017 | Bouchard et al. |
| 9,708,922 B1 | 7/2017 | Davis et al. |
| 9,714,580 B2 | 7/2017 | Slavens et al. |
| 9,745,854 B2 | 8/2017 | Baldiga et al. |
| 9,759,079 B2 | 9/2017 | Sippel et al. |
| 9,863,265 B2 | 1/2018 | Stapleton |
| 9,863,323 B2 | 1/2018 | Kirtley et al. |
| 9,869,201 B2 | 1/2018 | Dyson et al. |
| 9,874,104 B2 | 1/2018 | Shapiro |
| 9,915,162 B2 | 3/2018 | Duguay |
| 9,945,484 B2 | 4/2018 | Moehrle et al. |
| 9,957,827 B2 | 5/2018 | Davis et al. |
| 9,982,550 B2 | 5/2018 | Davis |
| 9,988,919 B2 | 6/2018 | Davis et al. |
| 9,988,923 B2 | 6/2018 | Snyder et al. |
| 10,012,099 B2 | 7/2018 | Cetel et al. |
| 10,024,193 B2 | 7/2018 | Shapiro |
| 10,072,517 B2 | 9/2018 | Boeke et al. |
| 10,082,085 B2 | 9/2018 | Thomas et al. |
| 10,087,771 B2 | 10/2018 | Mcgarrah |
| 10,100,660 B2 | 10/2018 | Sippel et al. |
| 10,132,197 B2 | 11/2018 | Heitman et al. |
| 10,138,747 B2 | 11/2018 | Dev et al. |
| 10,138,750 B2 | 11/2018 | Mccaffrey et al. |
| 10,167,957 B2 | 1/2019 | Davis et al. |
| 10,202,863 B2 | 2/2019 | Davis et al. |
| 10,265,806 B2 | 4/2019 | Cui et al. |
| 10,281,045 B2 | 5/2019 | Sippel et al. |
| 10,301,955 B2 | 5/2019 | Vetters et al. |
| 10,301,960 B2 | 5/2019 | Stapleton et al. |
| 10,378,385 B2 | 8/2019 | Tesson et al. |
| 10,378,386 B2 | 8/2019 | Roussille et al. |
| 10,415,426 B2 | 9/2019 | Quennehen et al. |
| 10,415,427 B2 | 9/2019 | Quennehen et al. |
| 10,422,241 B2 | 9/2019 | Mccaffrey et al. |
| 10,428,688 B2 | 10/2019 | Quennehen et al. |
| 10,428,953 B2 | 10/2019 | Lutjen et al. |
| 10,443,419 B2 | 10/2019 | Thomas et al. |
| 10,443,420 B2 | 10/2019 | Sippel et al. |
| 10,465,545 B2 | 11/2019 | Cetel et al. |
| 10,533,446 B2 | 1/2020 | Barak et al. |
| 10,550,706 B2 | 2/2020 | Lutjen et al. |
| 10,577,963 B2 | 3/2020 | Mccaffrey |
| 10,577,977 B2 | 3/2020 | Baucco |
| 10,584,605 B2 | 3/2020 | Sippel et al. |
| 10,590,803 B2 | 3/2020 | Quennehen et al. |
| 10,598,045 B2 | 3/2020 | Tableau et al. |
| 10,605,120 B2 | 3/2020 | Quennehen et al. |
| 10,619,517 B2 | 4/2020 | Quennehen et al. |
| 10,626,745 B2 | 4/2020 | Roussille et al. |
| 10,633,994 B2 | 4/2020 | Barker |
| 10,648,362 B2 | 5/2020 | Groves, II et al. |
| 10,655,495 B2 | 5/2020 | Groves, II et al. |
| 10,655,501 B2 | 5/2020 | Lepretre et al. |
| 10,662,794 B2 | 5/2020 | Das |
| 10,689,998 B2 | 6/2020 | Stapleton et al. |
| 10,690,007 B2 | 6/2020 | Quennehen et al. |
| 10,704,404 B2 | 7/2020 | Shi et al. |
| 10,718,226 B2 | 7/2020 | Vetters et al. |
| 10,724,399 B2 | 7/2020 | Carlin et al. |
| 10,731,494 B2 | 8/2020 | Dev et al. |
| 10,731,509 B2 | 8/2020 | Correia et al. |
| 10,738,643 B2 | 8/2020 | Mccaffrey et al. |
| 10,753,221 B2 | 8/2020 | Barker et al. |
| 10,787,924 B2 | 9/2020 | Quennehen et al. |
| 10,794,204 B2 | 10/2020 | Fitzpatrick et al. |
| 10,801,345 B2 | 10/2020 | Clum et al. |
| 10,801,349 B2 | 10/2020 | Mccaffrey |
| 10,815,807 B2 | 10/2020 | Vantassel et al. |
| 10,815,810 B2 | 10/2020 | Barker et al. |
| 10,830,357 B2 | 11/2020 | Mccaffrey et al. |
| 10,890,079 B2 | 1/2021 | Propheter-Hinckley et al. |
| 10,907,487 B2 | 2/2021 | Zurmehly et al. |
| 10,907,501 B2 | 2/2021 | Filippi et al. |
| 10,934,872 B2 | 3/2021 | Tableau et al. |
| 10,934,873 B2 | 3/2021 | Sarawate et al. |
| 10,968,761 B2 | 4/2021 | Barker et al. |
| 10,968,777 B2 | 4/2021 | Propheter-Hinckley et al. |
| 10,982,559 B2 | 4/2021 | Filippi |
| 11,002,144 B2 | 5/2021 | Azad et al. |
| 11,015,613 B2 | 5/2021 | Kerns et al. |
| 11,021,988 B2 | 6/2021 | Tableau et al. |
| 11,021,990 B2 | 6/2021 | Filippi |
| 11,028,720 B2 | 6/2021 | Tableau et al. |
| 11,041,399 B2 | 6/2021 | Lutjen et al. |
| 11,047,245 B2 | 6/2021 | Mccaffrey |
| 11,066,947 B2 | 7/2021 | Sippel et al. |
| 11,073,045 B2 | 7/2021 | Sippel et al. |
| 11,078,804 B2 | 8/2021 | Tableau et al. |
| 11,085,316 B2 | 8/2021 | Barker et al. |
| 11,085,317 B2 | 8/2021 | Johnson et al. |
| 11,105,215 B2 | 8/2021 | Roy Thill et al. |
| 11,111,794 B2 | 9/2021 | Bitzko et al. |
| 11,111,802 B2 | 9/2021 | Propheter-Hinckley et al. |
| 11,111,822 B2 | 9/2021 | Tableau et al. |
| 11,111,823 B2 | 9/2021 | Jarrossay et al. |
| 11,125,096 B2 | 9/2021 | Clark et al. |
| 11,125,098 B2 | 9/2021 | Barker et al. |
| 11,143,050 B2 | 10/2021 | Roy Thill et al. |
| 11,149,574 B2 | 10/2021 | Laroche |
| 11,174,747 B2 | 11/2021 | Roy Thill et al. |
| 11,174,795 B2 | 11/2021 | Lutjen et al. |
| 11,181,006 B2 | 11/2021 | Smoke et al. |
| 11,187,094 B2 | 11/2021 | Feldmann et al. |
| 11,215,064 B2 | 1/2022 | Arbona et al. |
| 11,215,065 B2 | 1/2022 | Starr et al. |
| 11,215,081 B2 | 1/2022 | Schilling et al. |
| 11,248,480 B2 | 2/2022 | Thirumalai et al. |
| 11,255,208 B2 | 2/2022 | Clark et al. |
| 11,255,209 B2 | 2/2022 | Clark et al. |
| 11,286,812 B1 | 3/2022 | Freeman et al. |
| 11,313,242 B2 | 4/2022 | Cetel et al. |
| 11,319,827 B2 | 5/2022 | Clark et al. |
| 11,319,828 B1 | 5/2022 | Freeman et al. |
| 11,326,463 B2 | 5/2022 | Blaney et al. |
| 11,326,470 B2 | 5/2022 | Dyson et al. |
| 11,346,237 B1 | 5/2022 | Freeman et al. |
| 11,346,251 B1 | 5/2022 | Freeman et al. |
| 11,365,635 B2 | 6/2022 | Read et al. |
| 11,441,434 B2 | 9/2022 | Danis et al. |
| 11,441,441 B1 | 9/2022 | Freeman et al. |
| 11,466,585 B2 | 10/2022 | Arbona et al. |
| 11,466,586 B2 | 10/2022 | Sippel et al. |
| 11,499,444 B1 | 11/2022 | Freeman et al. |
| 11,506,085 B2 | 11/2022 | Jarrossay et al. |
| 11,542,825 B2 | 1/2023 | Hauswirth et al. |
| 11,542,827 B2 | 1/2023 | Quennehen et al. |
| 11,624,291 B2 | 4/2023 | Roy Thill et al. |
| 11,624,292 B2 | 4/2023 | Clark et al. |
| 11,629,607 B2 | 4/2023 | Freeman et al. |
| 11,643,939 B2 | 5/2023 | Stoyanov et al. |
| 11,702,948 B2 | 7/2023 | Hock et al. |
| 11,702,949 B2 | 7/2023 | Freeman et al. |
| 11,713,694 B1 | 8/2023 | Freeman et al. |
| 11,732,604 B1 | 8/2023 | Freeman et al. |
| 11,761,351 B2 | 9/2023 | Freeman et al. |
| 11,773,751 B1 | 10/2023 | Freeman et al. |
| 11,781,440 B2 | 10/2023 | Vincent et al. |
| 11,781,448 B1 | 10/2023 | Holleran |
| 11,795,838 B2 * | 10/2023 | Jarrossay .............. F01D 25/246 |
| 11,840,930 B2 | 12/2023 | Propheter-Hinckley et al. |
| 11,840,936 B2 | 12/2023 | Freeman et al. |
| 11,879,342 B2 * | 1/2024 | Gaillard .................. F01D 11/08 |
| 11,879,349 B2 | 1/2024 | Schilling et al. |
| 2023/0184124 A1 | 6/2023 | Stoyanov et al. |
| 2023/0332506 A1 | 10/2023 | Freeman et al. |
| 2024/0003267 A1 | 1/2024 | Cazin et al. |

\* cited by examiner

TURBINE SHROUD ASSEMBLY WITH ANGLED COOLING HOLES

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements and using conventional cooling methods may present problems due to thermal expansion and/or material properties of the ceramic matrix composite components.

SUMMARY

The present disclosure may comprise one or more of the following features and combinations thereof.

A turbine shroud assembly for use with a gas turbine engine may include a blade track segment, a carrier segment, and a first retainer. The blade track segment may be made of ceramic matrix composite materials and arranged circumferentially at least partway around an axis to define a portion of a path of the turbine shroud assembly. The carrier segment may be made of metallic materials and supports the blade track segment to locate the blade track segment radially outward of the axis and arranged circumferentially at least partway around the axis. The first retainer may couple the blade track segment to the carrier segment.

In some embodiments, the blade track segment may include a shroud wall, a first attachment flange, and a second attachment flange. The shroud wall may extend circumferentially partway around the axis. The first attachment flange may extend radially outward from the shroud wall. The second attachment flange may extend radially outward from the should wall. The second attachment flange may be spaced apart axially from the first attachment flange.

In some embodiments, the carrier segment may include an outer wall, a forward support wall, and an aft support wall. The forward support wall may extend radially inward from the outer wall axially forward of the first attachment flange. The aft support wall may extend radially inward from the outer wall axially aft of the second attachment flange to define a chamber that receives the first and second attachment flanges of the blade track segment.

In some embodiments, the first retainer may extend axially into the blade track segment and the carrier segment to couple the blade track segment to the carrier segment. The first retainer may extend axially into the forward support wall and the aft support wall of the carrier segment and through the first attachment flange and the second attachment flange of the blade track segment so as to couple the blade track segment to the carrier segment.

In some embodiments, the outer wall of the carrier segment may be formed to include a cooling air plenum and a plurality of impingement passageways in fluid communication with the cooling air plenum and the chamber to conduct cooling air through the outer wall of the carrier segment into the chamber. The plurality of impingement passageways may extend radially through the outer wall of the carrier segment and may be angled circumferentially relative to the axis so as to allow the cooling air to move circumferentially into an open space of the chamber and diffuse before contacting the shroud wall to avoid localized high thermal gradient areas on the shroud wall of the blade track segment.

In some embodiments, the carrier segment may include a first intermediate support wall and a second intermediate support wall. The first intermediate support wall may extend radially inward from the outer wall of the carrier segment axially aft of the first attachment flange so that the first attachment flange is located axially between the forward support wall and the first intermediate support wall. The second intermediate support wall may extend radially inward from the outer wall of the carrier segment axially forward of the second attachment flange so that the second attachment flange is located axially between the aft support wall and the second intermediate support wall. The second intermediate support wall may be spaced apart axially from the first intermediate support wall to define the open space of the chamber.

In some embodiments, the plurality of impingement passageways may include a first impingement passageway and a second impingement passageway. The second impingement passageway may be spaced apart circumferentially from the first impingement passageway so that the first retainer is located circumferentially between the first impingement passageway and the second impingement passageway.

In some embodiments, the turbine shroud assembly may further comprise a second retainer. The second retainer may extend axially into the forward support wall and the aft support wall of the carrier segment and through the first attachment flange and the second attachment flange of the blade track segment. The second retainer may be spaced apart circumferentially from the first retainer. The second impingement passageway may be spaced apart circumferentially from the first impingement passageway so that the first retainer and the second retainer are located circumferentially between the first impingement passageway and the second impingement passageway.

In some embodiments, the plurality of impingement passageways may include a third impingement passageway that extends through the outer wall of the carrier segment circumferentially between the first retainer and the second retainer so that the third impingement passageway is located circumferentially between the first retainer and the second retainer. The plurality of impingement passageways may include a fourth impingement passageway that extends through the outer wall of the carrier segment circumferentially between the first retainer and the second retainer so that the fourth impingement passageway is located circumferentially between the first retainer and the second retainer. The fourth impingement passageway may be spaced apart circumferentially from the third impingement passageway.

In some embodiments, the first impingement passageway may extend circumferentially at a first angle relative to an inner surface of the carrier segment. The second impingement passageway may extend circumferentially at a second angle relative to the inner surface of the carrier segment. The second angle may be different than the first angle.

In some embodiments, each of the plurality of impingement passageways may extend circumferentially at an angle relative to an inner surface of the carrier segment. The angle of at least one impingement passageway of the plurality of impingement passageways may be different than the angle of the other impingement passageways of the plurality of impingement passageways. In some embodiments, the angle may be between about 20 degrees and about 70 degrees In some embodiments, the carrier segment may further include a first intermediate support wall and a second intermediate support wall. The first intermediate support wall may extend radially inward from the outer wall of the carrier segment axially between the first attachment flange and the second attachment flange. The second intermediate support wall may extend radially inward from the outer wall of the carrier segment axially between the first attachment flange and the second attachment flange and axially aft of the first intermediate support wall. The plurality of impingement passageways may extend radially through the outer wall axially between the first and second intermediate walls. In some embodiments, the retainer includes a first pin and a second pin located axially aft of the first pin.

In some embodiments, one of the plurality of impingement passageways may diffuse at least a portion of the cooling air on another shroud wall of an adjacent turbine shroud assembly. The adjacent turbine shroud assembly is arranged circumferentially adjacent to the turbine shroud assembly.

In some embodiments, the cooling air plenum may have an axially extending section and a circumferentially extending section. The axially extending section may extend through the forward support wall into the outer wall. The circumferentially extending section may extend circumferentially at least partway about the axis between the circumferential ends of the carrier segment.

According to another aspect of the present disclosure, a turbine shroud assembly for use with a gas turbine engine, the turbine shroud assembly may include a blade track segment and a carriage segment. The blade track segment may be arranged circumferentially at least partway around an axis to define a portion of a path of the turbine shroud assembly. The carrier segment may be arranged circumferentially at least partway around the axis and coupled with the blade track segment to support the blade track segment relative to the axis In some embodiments, the blade track segment may include a shroud wall and an attachment feature. The shroud wall may extend circumferentially partway around the axis. The attachment feature may extend radially outward from the shroud wall.

In some embodiments, the carrier segment may include an outer wall, a forward support wall, and an aft support wall. The forward support wall may extend radially inward from the outer wall axially forward of the attachment feature. The aft support wall may extend radially inward from the outer wall axially aft of the attachment feature.

In some embodiments, the outer wall of the carrier segment may be formed to include a plurality of impingement passageways in fluid communication with a chamber formed radially between the carrier segment and the blade track segment to conduct cooling air through the carrier segment into the chamber. The plurality of impingement passageways may extend radially and circumferentially through the outer wall of the carrier segment relative to the axis.

In some embodiments, the attachment feature of the blade track segment may include a first attachment flange and a second attachment flange spaced apart axially from the first attachment flange. The first attachment flange may extend radially outward from the shroud wall. The second attachment flange may extend radially outward from the should wall.

In some embodiments, the carrier segment may further include a first intermediate support wall and a second intermediate support wall. The first intermediate support wall may extend radially inward from the outer wall of the carrier segment axially aft of the first attachment flange so that the first attachment flange is located axially between the forward support wall and the first intermediate support wall. The second intermediate support wall may extend radially inward from the outer wall of the carrier segment axially forward of the second attachment flange so that the second attachment flange is located axially between the aft support wall and the second intermediate support wall, the second intermediate support wall spaced apart axially from the first intermediate support wall to define a portion of the chamber.

In some embodiments, the plurality of impingement passageways may include a first impingement passageway and a second impingement passageway. The second impingement passageway may be spaced apart circumferentially from the first impingement passageway so that the first retainer is located circumferentially between the first impingement passageway and the second impingement passageway.

In some embodiments, the first impingement passageway may extend circumferentially at a first angle relative to an inner surface of the carrier segment. The second impingement passageway may extend circumferentially at a second angle relative to the inner surface of the carrier segment. The second angle may be different than the first angle.

In some embodiments, the turbine shroud assembly may further comprise a second retainer. The second retainer may extend axially into the carrier segment and through the first attachment flange and the second attachment flange of the blade track segment. The second retainer may be spaced apart circumferentially from the first retainer to locate at least one of the plurality of impingement passageways circumferentially between the first retainer and the second retainer.

In some embodiments, the plurality of impingement passageways may include a first impingement passageway, a second impingement passageway, a third impingement passageway, and a fourth impingement passageway. The second impingement passageway may be spaced apart circumferentially from the first impingement passageway so that the first retainer and the second retainer are located circumferentially between the first impingement passageway and the second impingement passageway. The third impingement passageway may extend through the outer wall of the carrier segment circumferentially between the first retainer and the second retainer so that the third impingement passageway is located circumferentially between the first retainer and the second retainer. The fourth impingement passageway may extend through the outer wall of the carrier segment circumferentially between the first retainer and the second retainer so that the fourth impingement passageway is located circumferentially between the first retainer and the second retainer. The fourth impingement passageway may be spaced apart circumferentially from the third impingement passageway.

In some embodiments, each of the plurality of impingement passageways may extend circumferentially at an angle relative to an inner surface of the carrier segment. The angle of at least one impingement passageway of the plurality of impingement passageways may be different than the angle of the other impingement passageways of the plurality of impingement passageways.

According to another aspect of the present disclosure, a method may comprise providing a blade track segment. The blade track segment may include a shroud wall shaped to extend partway around an axis, a first attachment flange that extends radially outward from the shroud wall, and a second attachment flange spaced apart axially from the first attachment flange that extends radially outward from the shroud wall.

In some embodiments, the method may further comprise providing a carrier segment. The carrier segment may include an outer wall, a first support wall that extends radially inward from the outer wall, and a second support wall spaced apart axially from the first support wall that extends radially inward from the outer wall. The outer wall may be formed to include a plurality of impingement passageways that extend radially and circumferentially through the outer wall of the carrier segment relative to the axis.

In some embodiments, the method may further comprise providing a first retainer. The method may further comprise arranging the blade track segment adjacent the carrier segment so that the first attachment flange and the second attachment flange are located axially between the first support wall and the second support wall of the carrier segment and inserting the first retainer through the first support wall, the first attachment flange, the second attachment flange, and the second support wall to couple the blade track segment to the carrier segment.

In some embodiments, the method may further comprise conducing a flow of cooling air through the plurality of impingement passageways into a chamber formed radially between the carrier segment and the blade track segment to cool the blade track segment. The method may further comprise diffusing the flow of cooling air as the cooling air is conducted in the chamber to avoid localized high thermal gradient areas on the shroud wall of the blade track segment.

These and other features of the present disclosure will become more apparent from the following description of the illustrative embodiments.

DETAILED DESCRIPTION OF THE DRAWINGS

Figure 1:
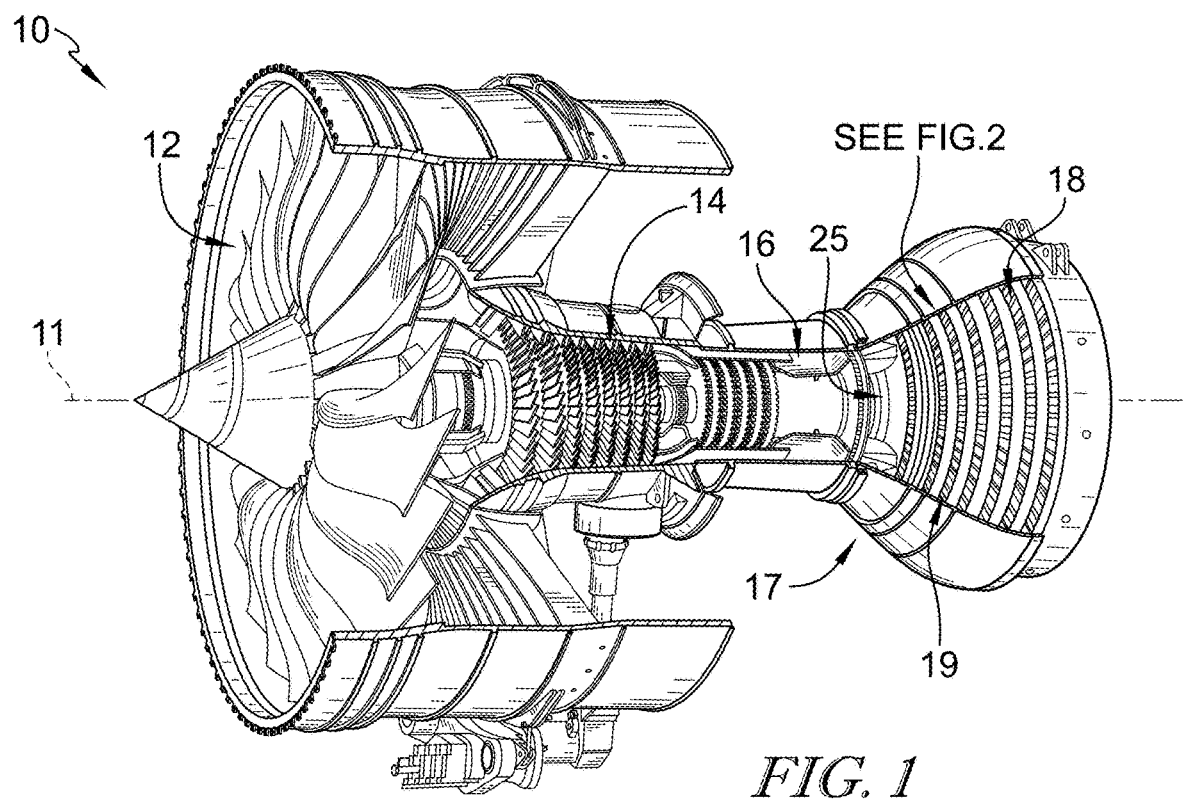
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

A turbine shroud segment 22 is shown in FIGS. 2-6 and is adapted for use in a gas turbine engine 10 as shown in FIG. 1. The turbine shroud segment 22 includes a blade track segment 24 arranged circumferentially at least partway around an axis 11 of the gas turbine engine 10, a carrier segment 26 arranged circumferentially at least partway around the axis 11, and a mount system 28 configured to couple the blade track segment 24 to the carrier segment 26 as shown in FIGS. 2-6.

The blade track segment 24 is a ceramic matrix composite component configured to directly face the high temperatures of a gas path 25 of the gas turbine engine 10 to define a portion of the gas path 25. The carrier segment 26 is a metallic support component configured to interface with other metallic components of the gas turbine engine 10, such as the case 17, to support the blade track segment 24 to radially locate the blade track segment 24 relative to the axis 11. The mount system 28 includes at least one retainer, and illustratively the mount system 28 includes two retainers 60, 62 that each extend axially into the blade track segment 24 and the carrier segment 26 to couple the blade track segment 24 to the carrier segment 26.

During operation of the gas turbine engine 10, the hot, high-pressure products directed into the turbine 18 from the combustor 16 flow across a shroud wall 30 of the blade track segment 24 that defines a portion of the gas path 25. The hot gases flowing across the shroud wall 30 heat the blade track segment 24, which may transfer heat to the retainers 60, 62 that couple the blade track segment 24 to the carrier segment 26. The retainers 60, 62 are made of metallic materials in the illustrative embodiment. The added heat may challenge the life of the retainers 60, 62.

The carrier segment 26 includes impingement passageways to conduct cooling air through the carrier segment 26 to the blade track segment 24 to cool the blade track segment 24. Conventional impingement passageways may extend radially relative to the blade track segment 24. However, these impingement passageways may create localized high thermal gradient areas or localized cold areas on the shroud wall 30 of the blade track segment 24.

Therefore, the carrier segment 26 of the present disclosure is formed to include a cooling air plenum 50 and a plurality of impingement passageways 52, 54, 56, 58. The impingement passageways 52, 54, 56, 58 are in fluid communication with the cooling air plenum 50 to conduct cooling air through the carrier segment 26 into a chamber 38 defined radially between the carrier segment 26 and the blade track segment 24 in angled directions to allow the air to diffuse and swirl in the chamber 38. More particularly, the plurality of impingement passageways 52, 54, 56, 58 extend radially through an outer wall 40 of the carrier segment 26 and are angled circumferentially relative to the axis 11 so as to allow the cooling air to move circumferentially into an open space of the chamber 38 and diffuse before contacting the shroud wall 30 to avoid creating localized high thermal gradient areas on the shroud wall 30 of the blade track segment 24.

Figure 6:
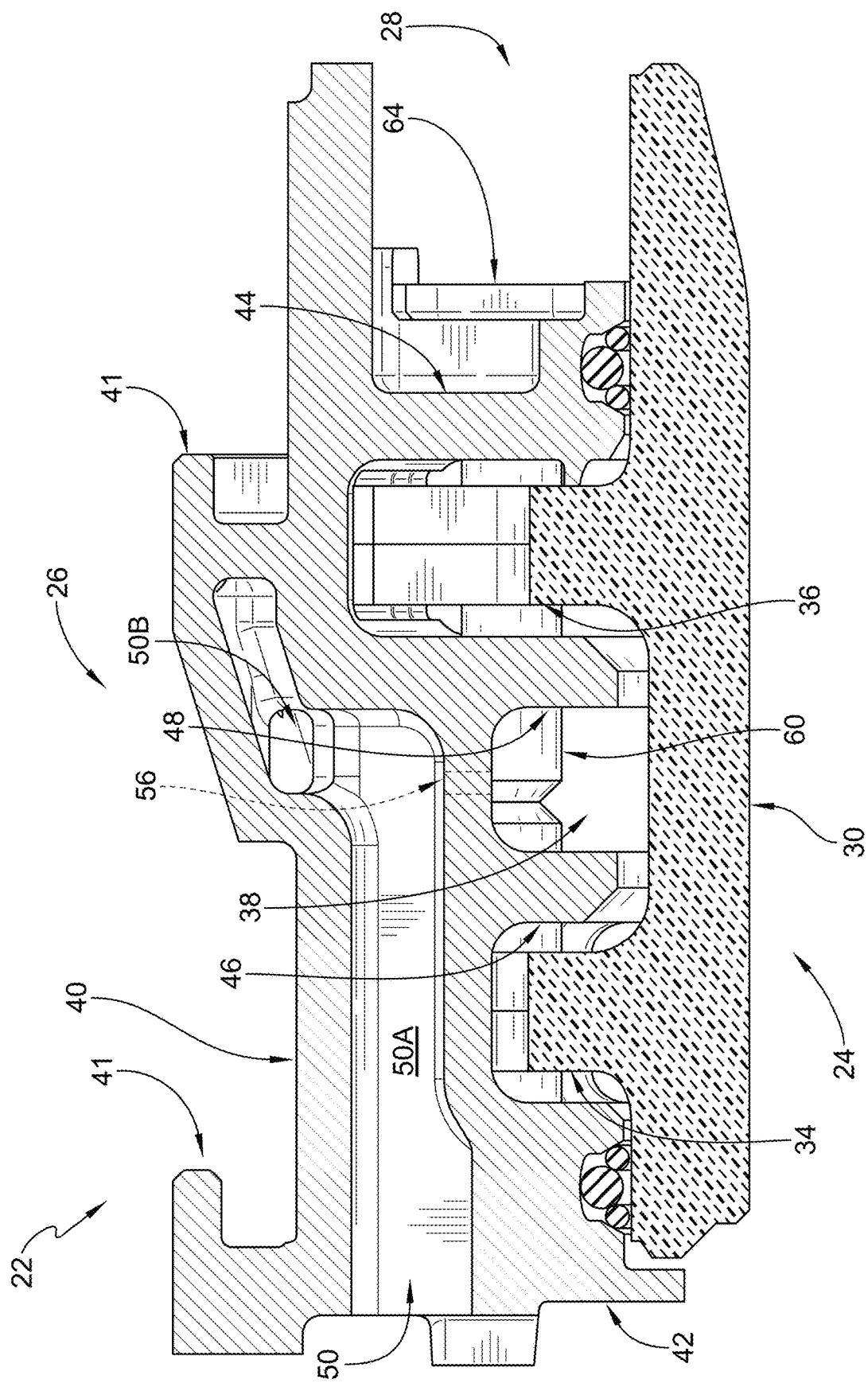
FIG. 6 is a cross-sectional view of the turbine shroud assembly of FIG. 3 taken along line 6-6 showing the carrier segment includes the outer wall, a forward and aft support walls that each extend radially inward from the outer wall axially forward and aft of the attachment feature, and first and second intermediate support walls that each extend radially inward from the outer wall of axially between the forward and aft support walls, and further showing the outer wall is formed to define the cooling air plenum and the chamber is defined between the outer wall and the intermediate support walls.

Each of the plurality of impingement passageways 52, 54, 56, 58 extends circumferentially at an angle 52A, 54A, 56A, 58A relative to an inner surface 40S of the carrier segment 26 as shown in FIG. 6. The angle 52A, 54A, 56A, 58A of each impingement passageway 52, 54, 56, 58 is between about 20 degrees and about 70 degrees. In the illustrative embodiment, the angles 52A, 54A, 56A, 58A are each about 45 degrees.

In the illustrative embodiment, the angle 52A, 54A, 56A, 58A of each of the impingement passageways 52, 54, 56, 58 is the same. In some embodiments, the angle 52A, 54A, 56A, 58A of at least one impingement passageway 52, 54, 56, 58 of the plurality of impingement passageways 52, 54, 56, 58 is different than the angle 52A, 54A, 56A, 58A of the other impingement passageways 52, 54, 56, 58. In some embodiments, the angle 52A, 54A, 56A, 58A of two of the impingement passageways 52, 54, 56, 58 may be different than the angle 52A, 54A, 56A, 58A of the other impingement passageways 52, 54, 56, 58.

Figure 5:
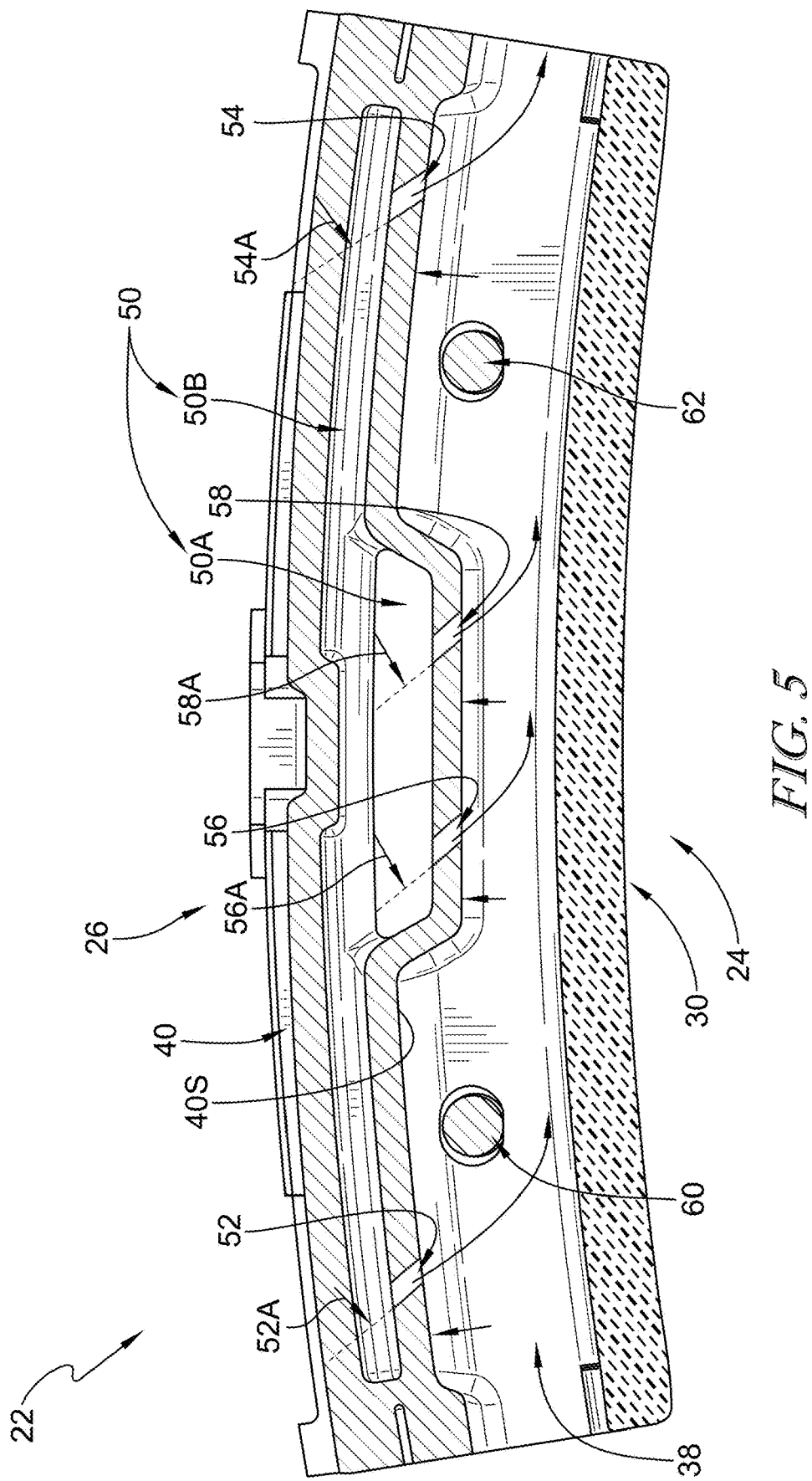
FIG. 5 is a cross-sectional view of the turbine shroud assembly of FIG. 3 taken along line 5-5 showing the plurality of impingement passageways extending radially through an outer wall of the carrier segment and angled circumferentially relative to the axis so as to direct the cooling air to move circumferentially into an open space of the chamber and diffuse before contacting the shroud wall to avoid localized high thermal gradient areas on the shroud wall of the blade track segment.

In the illustrative embodiment, all the impingement passageways 52, 54, 56, 58 extend circumferentially in the same direction about the axis 11. The impingement passageways 52, 54, 56, 58 may extend in a first circumferential direction as shown in FIG. 5. In some embodiments, the impingement passageways 52, 54, 56, 58 may extend in the opposite circumferential direction. The circumferential angle directs the air to swirl in a circumferential and radial pattern in the chamber 38. The arrows in FIG. 5 show the circumferential angle of each impingement passageway 52, 54, 56, 58 directs the air to swirl in a circumferential and radial pattern.

In some embodiments, one of the impingement passageways 52, 54 at least partially impinges on the shroud wall 30 of the adjacent segment depending on the circumferentially direction the impingement passageways 52, 54 extend about the axis 11.

With the impingement passageways of the present disclosure initially described above, the gas turbine engine 10 is now described in more detail. The gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
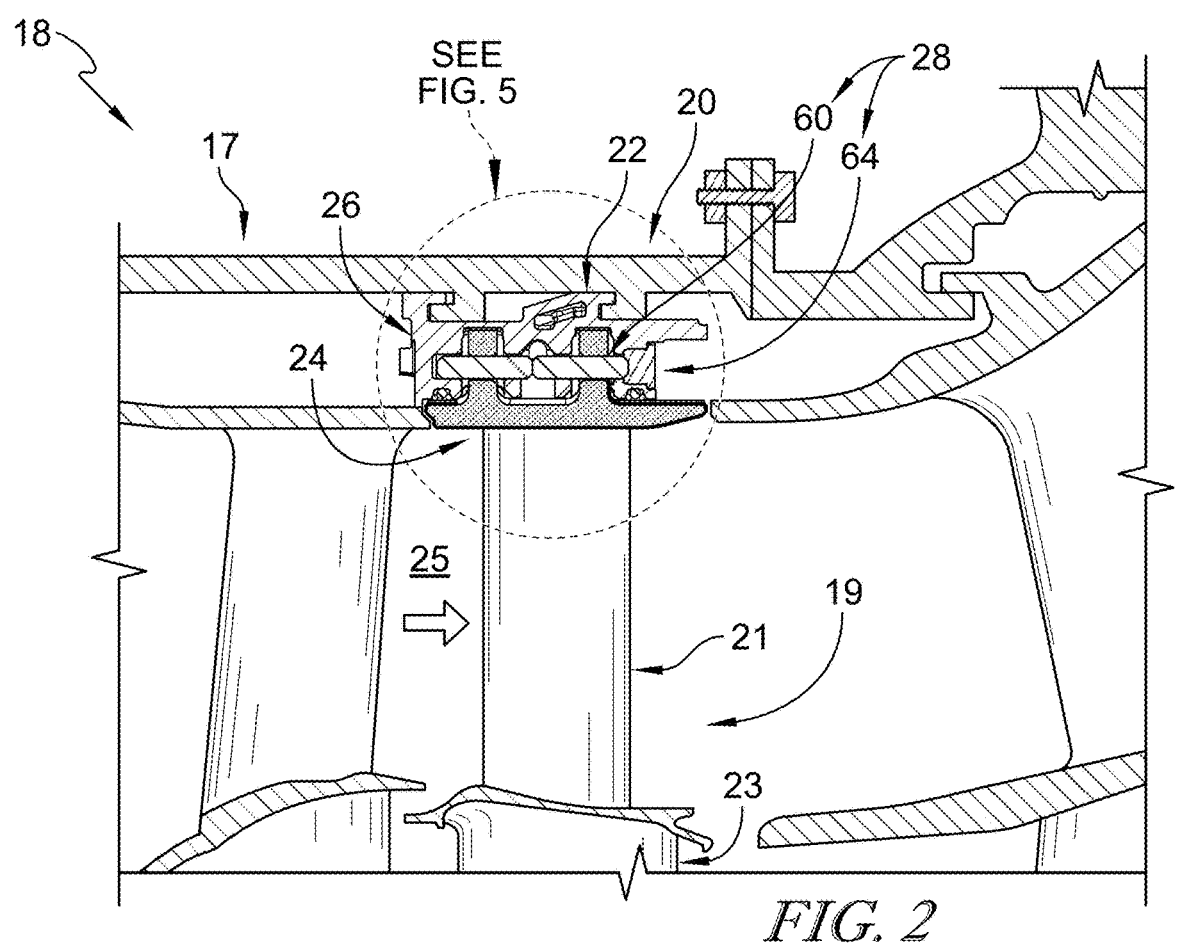
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades.

The turbine 18 includes at least one turbine wheel assembly 19 and a turbine shroud 20 positioned to surround the turbine wheel assembly 19 as shown in FIGS. 1 and 2. The turbine wheel assembly 19 includes a plurality of blades 21 coupled to a rotor disk 23 for rotation with the disk 23. The hot, high pressure combustion products from the combustor 16 are directed toward the blades 21 of the turbine wheel assemblies 19 along the gas path 25. The turbine shroud 20 is coupled to the outer case 17 of the gas turbine engine 10 and extends around the turbine wheel assembly 19 to block gases from passing over the turbine blades 21 during use of the turbine 18 in the gas turbine engine 10.

In the illustrative embodiment, the turbine shroud 20 is made up of a number of turbine shroud segment assemblies 22 that each extend circumferentially partway around the axis 11 and cooperate to surround the turbine wheel assembly 19. In other embodiments, the turbine shroud 20 is annular and non-segmented to extend fully around the axis 11 and surround the turbine wheel assembly 19. In yet other embodiments, certain components of the turbine shroud 20 are segmented while other components are annular and non-segmented.

Each turbine shroud segment 22 includes the blade track segment 24, the carrier segment 26, and the mount system 28 as shown in FIGS. 2-6. The blade track segment 24 and the carrier segment 26 are arranged circumferentially partway about the axis 11. The mount system 28 is configured to couple the blade track segment 24 to the carrier segment 26.

Figure 4:
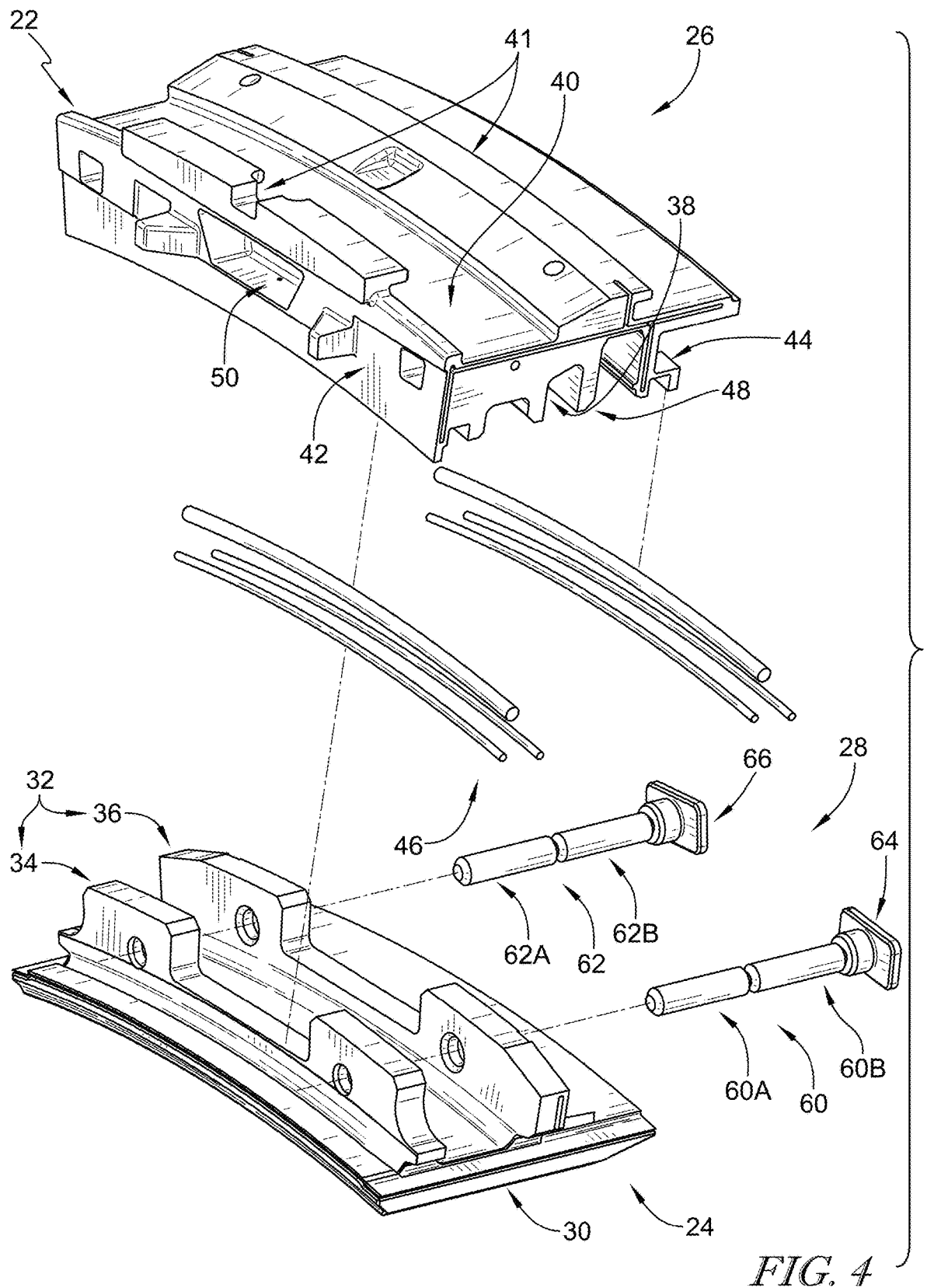
FIG. 4 is an exploded view of the turbine shroud assembly of FIG. 3 showing, from top to bottom, the turbine shroud assembly includes the carrier segment, the blade track segment, and two retainers configured to extend radially through the carrier and the blade track segment to couple the blade track segment to the carrier.

The blade track segment 24 includes the shroud wall 30 and an attachment feature 32 as shown in FIGS. 4-6. The shroud wall 30 that extends circumferentially partway around the axis 11. The attachment feature 32 includes a first attachment flange 34 and a second attachment flange 36 that each extend radially outward from the shroud wall. The second attachment flange 36 is spaced apart axially from the first attachment flange 34.

The carrier segment includes an outer wall 40, a pair of hangers 41, a forward support wall 42, and an aft support wall 44 as shown in FIGS. 3-6. The outer wall 40 extends circumferentially at least partway about the axis 11. The hangers 41 extend radially outward from the outer wall 40 and engage the case 17 to couple the turbine shroud segment 22 to the rest of the engine 10.

The forward support wall 42 extends radially inward from the outer wall 40 axially forward of the first attachment flange 34. The aft support wall 44 extends radially inward from the outer wall 40 axially aft of the second attachment flange 36. The outer wall 40 of the carrier segment 26 is spaced radially outward of the attachment feature 32 of the blade track segment 24 to define a chamber 38 radially between the carrier segment 26 and the blade track segment 24.

The outer wall 40 of the carrier segment 26 is formed to include the cooling air plenum 50 and the plurality of impingement passageways 52, 54, 56, 58 in fluid communication with the cooling air plenum 50 and the chamber 38 to conduct cooling air through the carrier segment 26 into the chamber 38 formed between the carrier segment 26 and the blade track segment 24. The plurality of impingement passageways 52, 54, 56, 58 extend radially through the outer wall 40 of the carrier segment 26 and are angled circumferentially relative to the axis 11 so as to allow the cooling air to move circumferentially into an open space of the chamber 38 and diffuse before contacting the shroud wall 30 to avoid localized high thermal gradient areas on the shroud wall 30 of the blade track segment 24.

Figure 3:
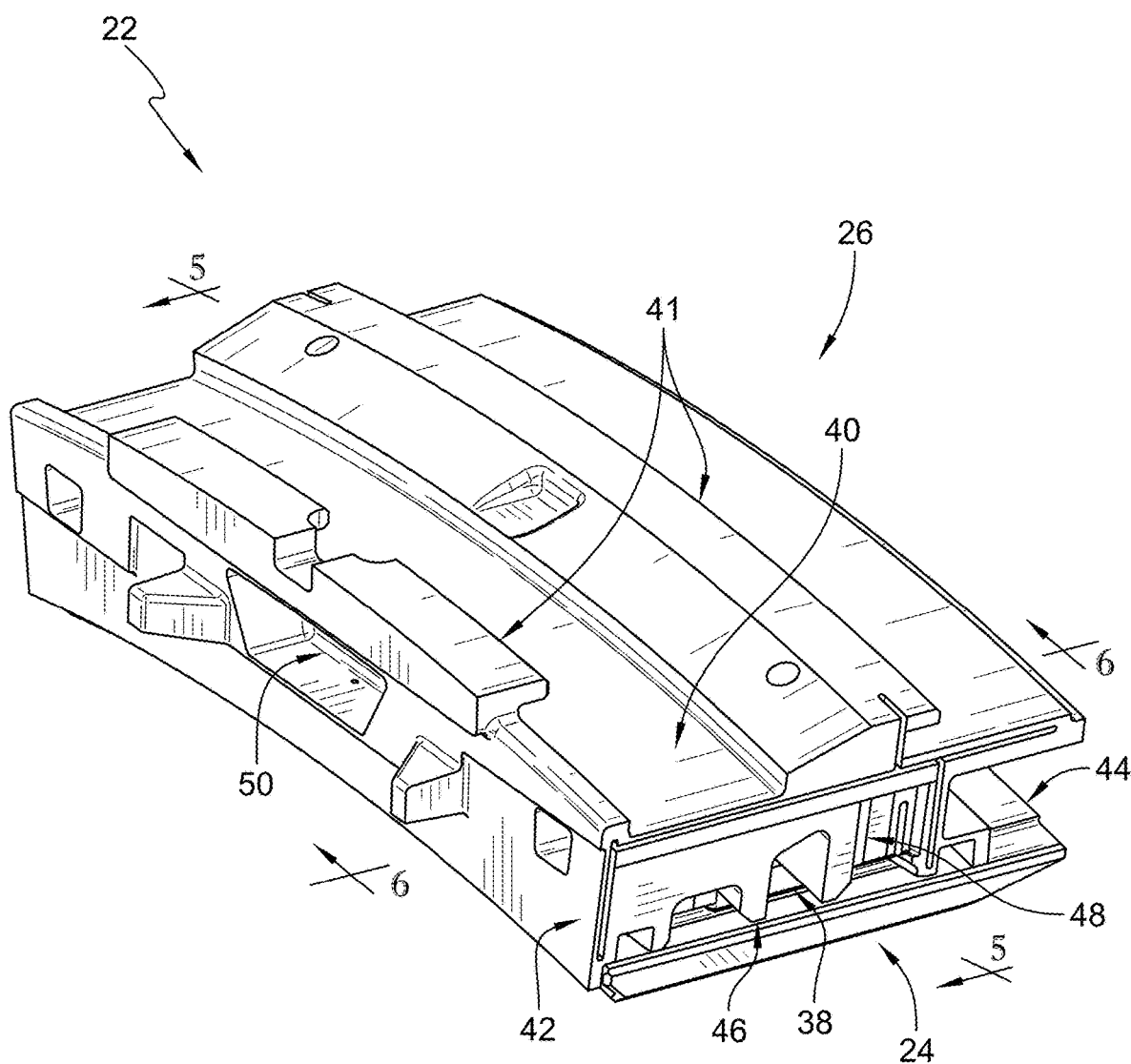
FIG. 3 is a perspective view of a portion of the turbine shroud assembly of FIG. 2 showing the turbine shroud assembly includes a carrier segment and a blade track segment made from ceramic matrix composite materials coupled to the carrier segment to define a chamber radially between the carrier segment and the blade track segment, and further showing the carrier is formed to include a cooling air plenum having an inlet in a forward face of the carrier and a plurality of impingement passageways in fluid communication with the cooling air plenum and the chamber to conduct cooling air through the carrier segment into the chamber to cool the blade track segment.

In the illustrative embodiment, the carrier segment 26 further includes a first intermediate support wall 46 and a second intermediate support wall 48 as shown in FIGS. 3, 4, and 6. The first intermediate support wall 46 and the second intermediate support wall 48 each extend radially inward from the outer wall 40 of the carrier segment 26.

The first intermediate support wall 46 extends radially inward from the outer wall 40 axially aft of the first attachment flange 34 of the blade track segment 24 so that the first attachment flange 34 is located in a forward space between the forward support wall 42 and the first intermediate support wall 46. The second intermediate support wall 48 extends radially inward from the outer wall axially forward of the second attachment flange 36 of the blade track segment 24 so that the second attachment flange 36 is located in an aft space between the aft support wall 44 and the second intermediate support wall 48.

The second intermediate support wall 48 is spaced apart axially from the first intermediate support wall 46 to define the open space of the chamber 38. In the illustrative embodiment, the open space of the chamber 38 is defined between the first and second intermediate support walls 46, 48, the outer wall 40 of the carrier segment 26, and the shroud wall 30 of the blade track segment.

The plurality of impingement passageways 52, 54, 56, 58 extend through the outer wall 40 axially between the first and second intermediate support walls 46, 48 so that the plurality of impingement passageways 52, 54, 56, 58 are in fluid communication with the cooling air plenum 50 and the chamber 38 to conduct cooling air through the carrier segment 26 into the chamber 38. The plurality of impingement passageways 52, 54, 56, 58 extend radially through the outer wall 40 of the carrier segment 26 and are angled circumferentially relative to the axis 11. Each of the plurality of impingement passageways 52, 54, 56, 58 extends circumferentially at an angle 52A, 54A, 56A, 58A relative to the inner surface 40S of the carrier segment 26, which is substantially parallel with the backside surface of the shroud wall 30. The angle 52A, 54A, 56A, 58A of each impingement passageway 52, 54, 56, 58 is between about 20 degrees and about 70 degrees.

In some embodiments, the angle 52A, 54A, 56A, 58A of each impingement passageway 52, 54, 56, 58 is between about 30 degrees and about 70 degrees. In some embodiments, the angle 52A, 54A, 56A, 58A of each impingement passageway 52, 54, 56, 58 is between about 40 degrees and about 70 degrees. In some embodiments, the angle 52A, 54A, 56A, 58A of each impingement passageway 52, 54, 56, 58 is between about 50 degrees and about 70 degrees. In some embodiments, the angle 52A, 54A, 56A, 58A of each impingement passageway 52, 54, 56, 58 is between about 60 degrees and about 70 degrees.

In some embodiments, the angle 52A, 54A, 56A, 58A of each impingement passageway 52, 54, 56, 58 is between about 20 degrees and about 60 degrees. In some embodiments, the angle 52A, 54A, 56A, 58A of each impingement passageway 52, 54, 56, 58 is between about 20 degrees and about 50 degrees. In some embodiments, the angle 52A, 54A, 56A, 58A of each impingement passageway 52, 54, 56, 58 is between about 20 degrees and about 40 degrees. In some embodiments, the angle 52A, 54A, 56A, 58A of each impingement passageway 52, 54, 56, 58 is between about 20 degrees and about 30 degrees.

In some embodiments, the angle 52A, 54A, 56A, 58A of each impingement passageway 52, 54, 56, 58 is between about 30 degrees and about 60 degrees. In some embodiments, the angle 52A, 54A, 56A, 58A of each impingement passageway 52, 54, 56, 58 is between about 30 degrees and about 50 degrees. In some embodiments, the angle 52A, 54A, 56A, 58A of each impingement passageway 52, 54, 56, 58 is between about 30 degrees and about 40 degrees. In some embodiments, the angle 52A, 54A, 56A, 58A of each impingement passageway 52, 54, 56, 58 is between about 40 degrees and about 60 degrees. In some embodiments, the angle 52A, 54A, 56A, 58A of each impingement passageway 52, 54, 56, 58 is between about 40 degrees and about 50 degrees. In some embodiments, the angle 52A, 54A, 56A, 58A of each impingement passageway 52, 54, 56, 58 is between about 50 degrees and about 60 degrees.

In some embodiments, the angle 52A, 54A, 56A, 58A of each impingement passageway 52, 54, 56, 58 is about 20 degrees. In some embodiments, the angle 52A, 54A, 56A, 58A of each impingement passageway 52, 54, 56, 58 is about 25 degrees. In some embodiments, the angle 52A, 54A, 56A, 58A of each impingement passageway 52, 54, 56, 58 is about 30 degrees. In some embodiments, the angle 52A, 54A, 56A, 58A of each impingement passageway 52, 54, 56, 58 is about 35 degrees.

In some embodiments, the angle 52A, 54A, 56A, 58A of each impingement passageway 52, 54, 56, 58 is about 40 degrees. In some embodiments, the angle 52A, 54A, 56A, 58A of each impingement passageway 52, 54, 56, 58 is about 45 degrees. In some embodiments, the angle 52A, 54A, 56A, 58A of each impingement passageway 52, 54, 56, 58 is about 50 degrees. In some embodiments, the angle 52A, 54A, 56A, 58A of each impingement passageway 52, 54, 56, 58 is about 55 degrees.

In some embodiments, the angle 52A, 54A, 56A, 58A of each impingement passageway 52, 54, 56, 58 is about 60 degrees. In some embodiments, the angle 52A, 54A, 56A, 58A of each impingement passageway 52, 54, 56, 58 is about 65 degrees. In some embodiments, the angle 52A, 54A, 56A, 58A of each impingement passageway 52, 54, 56, 58 is about 70 degrees.

The plurality of impingement passageways 52, 54, 56, 58 are located axially between the first and second intermediate support walls 46, 48 in the illustrative embodiment. In other embodiments, the plurality of impingement passageways 52, 54, 56, 58 and/or additional impingement passageways may be located axially forward of the intermediate support wall 46 or aft of the intermediate support wall 48. In other embodiments, the intermediate support walls 46, 48 are omitted and the of impingement passageways 52, 54, 56, 58 are located axially between the first and second attachment flanges 34, 36.

In the illustrative embodiment, the cooling air plenum 50 has an axially extending section 50A and a circumferentially extending section 50B as shown in FIGS. 5 and 6. The axially extending section 50A extends through the forward support wall 42 into the outer wall 40 as shown in FIG. 6. The circumferentially extending section 50B extends circumferentially at least partway about the axis between the circumferential ends of the carrier segment 26 as shown in FIG. 5.

In the illustrative embodiment, the circumferentially extending section 50B of the cooling air plenum 50 does not extend through the circumferential ends of the carrier segment 26. In other embodiments, the circumferentially extending section 50B of the cooling air plenum 50 may extend through the circumferential ends of the carrier segment 26 so that each cooling air plenum 50 of adjacent turbine shroud segments 22 are in fluid communication with each other.

In the illustrative embodiment, the plurality of impingement passageways 52, 54, 56, 58 includes a first impingement passageway, a second impingement passageway, a third impingement passageway, and a fourth impingement passageway as shown in FIG. 5. The passageways 52, 54, 56, 58 are spaced apart circumferentially about the axis 11. Each of the passageways 53, 54, 56, 58 opens into the circumferentially extending section 50B of the cooling air plenum 50 and the chamber 38.

In some embodiments, the carrier segment 26 may be formed to include more than four impingement passageways 52, 54, 56, 58. In some embodiments, the carrier segment 26 may be formed to include less than four impingement passageways 52, 54, 56, 58. In some embodiments, the carrier segment 26 may be formed to include a single one of impingement passageways 52, 54, 56, 58.

The mount system 28 includes a first retainer 60, a second retainer 62 spaced apart circumferentially from the first retainer 62, a first retainer plug 64 circumferentially aligned with the first retainer 60, and a second retainer plug 66 circumferentially aligned with the second retainer 62 as shown in FIGS. 2-6. Both the first and second retainers 60, 62 extend axially into the forward support wall 42, through the first attachment flange 34, the intermediate support walls 46, 48, and the second attachment flange 36, and into the aft support wall 44 of the carrier segment 26 so as to couple the blade track segment 24 to the carrier segment 26. Each of the retainer plugs 64, 66 extend into installation apertures 60H, 62H formed in the aft support wall 44 to block removal of the corresponding retainers 60, 62 through the installation apertures 60H, 62H. In the illustrative embodiment, the first and second retainers 60, 62 are both split pins as shown in FIGS. 2 and 4. Each retainer 60, 62 includes a first pin 60A, 62A and a second pin 60B, 62B.

The first impingement passageway 52 is spaced apart circumferentially from the second impingement passageway 54 so that the first retainer 60 is located circumferentially between the first impingement passageway 52 and the second impingement passageway 54 as shown in FIG. 5. In the illustrative embodiment, the second impingement passageway 54 is spaced apart circumferentially from the first impingement passageway 52 so that the first retainer 60 and the second retainer 62 are located circumferentially between the first impingement passageway 52 and the second impingement passageway 54 as shown in FIG. 6.

The third impingement passageway 56 and the fourth impingement passageway 58 each extend through the outer wall 40 of the carrier segment 26 circumferentially between the first retainer 60 and the second retainer 62 so that the third and fourth impingement passageways 56, 58 are located circumferentially between the first retainer 60 and the second retainer 62 as shown in FIG. 6. The fourth impingement passageway 58 is spaced apart circumferentially from the third impingement passageway 56.

In the illustrative embodiment, the third and fourth impingement passageways 56, 58 are at a first radial distance from the shroud wall 30 of the blade track segment 24, while the first and second impingement passageways 52, 54 are at a second radial distance from the shroud wall 30 as shown in FIG. 5. The second radial distance is greater than the first radial distance so that the third and fourth impingement passageways 56, 58 open closer to the shroud wall 30 as shown in FIG. 5. In some embodiments, each of the impingement passageways 52, 54, 56, 58 may be at a different radial distance from the shroud wall 30 of the blade track segment 24.

A method of assembling and using the turbine shroud segment 22 may include several steps. To begin assembling the turbine shroud segment 22, the method includes arranging the blade track segment 24 adjacent the carrier segment 26 so that the first attachment flange 32 and the second attachment flange 34 are located axially between the first support wall 42 and the second support wall 44 of the carrier segment 26. The blade track segment 24 is arranged adjacent the carrier segment 26 so that holes in the attachment flanges 34, 36 align with the holes in the support walls 42, 44, 46, 48 of the carrier segment 26.

The method continues by inserting the first retainer 60 through the aft support wall 44, the second attachment flange 36, the intermediate support walls 46, 48, and the first attachment flange 34 and into the forward support wall 42 to couple the blade track segment 24 to the carrier segment 26. The method further includes inserting the second retainer 62 through the aft support wall 44, the second attachment flange 36, the intermediate support walls 46, 48, and the first attachment flange 34 and into the forward support wall 42 to couple the blade track segment 24 to the carrier segment 26.

The method may further include inserting the first retainer plug 64 into the installation aperture 60H and inserting the second retainer plug 66 into the installation aperture 62H. The retainer plugs 64, 66 are inserted into the corresponding installation apertures 60H, 62H to block removal of the retainers 60, 62.

Once the blade track segment 24 is coupled to the carrier segment 26, the method continues by conducing the flow of cooling air through the plurality of impingement passageways 52, 54, 56, 58 into the chamber 38 formed radially between the carrier segment and the blade track segment 24 to cool the blade track segment 24. The method further includes diffusing the flow of cooling air as the cooling air is conducted in the chamber 38 to avoid localized high thermal gradient areas on the shroud wall of the blade track segment 24.

For the purposes of the present disclosure, the modifier about means±1% of the given value. Of course, greater or lesser deviation is contemplated and may be used in processed method within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising a blade track segment made of ceramic matrix composite materials and arranged circumferentially at least partway around an axis to define a portion of a path of the turbine shroud assembly, the blade track segment having a shroud wall that extends circumferentially partway around the axis, a first attachment flange that extends radially outward from the shroud wall, and a second attachment flange that extends radially outward from the should wall, the second attachment flange spaced apart axially from the first attachment flange, a carrier segment made of metallic materials that supports the blade track segment to locate the blade track segment radially outward of the axis and arranged circumferentially at least partway around the axis, the carrier segment including an outer wall, a forward support wall that extends radially inward from the outer wall axially forward of the first attachment flange, and an aft support wall that extends radially inward from the outer wall axially aft of the second attachment flange to define a chamber that receives the first and second attachment flanges of the blade track segment, and a first retainer that extends axially into the forward support wall and the aft support wall of the carrier segment and through the first attachment flange and the second attachment flange of the blade track segment so as to couple the blade track segment to the carrier segment, wherein the outer wall of the carrier segment is formed to include a cooling air plenum and a plurality of impingement passageways in fluid communication with the cooling air plenum and the chamber to conduct cooling air through the outer wall of the carrier segment into the chamber, and wherein each impingement passageway of the plurality of impingement passageways has a primary axis extending radially through the outer wall of the carrier segment and angled circumferentially relative to the axis so as to allow the cooling air to move circumferentially into an open space of the chamber and diffuse before contacting the shroud wall to avoid localized high thermal gradient areas on the shroud wall of the blade track segment.

2. The turbine shroud assembly of claim 1, wherein the carrier segment further includes a first intermediate support wall that extends radially inward from the outer wall of the carrier segment axially aft of the first attachment flange so that the first attachment flange is located axially between the forward support wall and the first intermediate support wall and a second intermediate support wall that extends radially inward from the outer wall of the carrier segment axially forward of the second attachment flange so that the second attachment flange is located axially between the aft support wall and the second intermediate support wall, and wherein the second intermediate support wall is spaced apart axially from the first intermediate support wall to define the open space of the chamber.

3. The turbine shroud assembly of claim 1, wherein the plurality of impingement passageways includes a first impingement passageway and a second impingement passageway spaced apart circumferentially from the first impingement passageway so that the first retainer is located circumferentially between the first impingement passageway and the second impingement passageway.

4. The turbine shroud assembly of claim 3, further comprising a second retainer that extends axially into the forward support wall and the aft support wall of the carrier segment and through the first attachment flange and the second attachment flange of the blade track segment, the second retainer spaced apart circumferentially from the first retainer, the second impingement passageway is spaced apart circumferentially from the first impingement passageway so that the first retainer and the second retainer are located circumferentially between the first impingement passageway and the second impingement passageway.

5. The turbine shroud assembly of claim 4, wherein the plurality of impingement passageways includes a third impingement passageway that extends through the outer wall of the carrier segment circumferentially between the first retainer and the second retainer so that the third impingement passageway is located circumferentially between the first retainer and the second retainer.

6. The turbine shroud assembly of claim 5, wherein the plurality of impingement passageways includes a fourth impingement passageway that extends through the outer wall of the carrier segment circumferentially between the first retainer and the second retainer so that the fourth impingement passageway is located circumferentially between the first retainer and the second retainer, the fourth impingement passageway spaced apart circumferentially from the third impingement passageway.

7. The turbine shroud assembly of claim 3, wherein the first impingement passageway extends circumferentially at a first angle relative to an inner surface of the carrier segment and the second impingement passageway extends circumferentially at a second angle relative to the inner surface of the carrier segment, and wherein the second angle is different than the first angle.

8. The turbine shroud assembly of claim 1, wherein each of the plurality of impingement passageways extends circumferentially at an angle relative to an inner surface of the carrier segment and the angle of at least one impingement passageway of the plurality of impingement passageways is different than the angle of the other impingement passageways of the plurality of impingement passageways.

9. The turbine shroud assembly of claim 8, wherein the angle is between about 20 degrees and about 70 degrees.

10. The turbine shroud assembly of claim 8, wherein the carrier segment further includes a first intermediate support wall that extends radially inward from the outer wall of the carrier segment axially between the first attachment flange and the second attachment flange and a second intermediate support wall that extends radially inward from the outer wall of the carrier segment axially between the first attachment flange and the second attachment flange and axially aft of the first intermediate support wall, and wherein the plurality of impingement holes extend radially through the outer wall axially between the first and second intermediate walls.

11. The turbine shroud assembly of claim 8, wherein one of the plurality of impingement passageways diffuses at least a portion of the cooling air on another shroud wall of an adjacent turbine shroud assembly arranged circumferentially adjacent to the turbine shroud assembly.

12. The turbine shroud assembly of claim 1, wherein the cooling air plenum has an axially extending section that extends through the forward support wall into the outer wall and a circumferentially extending section that extends circumferentially at least partway about the axis between the circumferential ends of the carrier segment.

13. A turbine shroud assembly for use with a gas turbine engine, the turbine shroud assembly comprising a blade track segment arranged circumferentially at least partway around an axis to define a portion of a path of the turbine shroud assembly, the blade track segment having a shroud wall that extends circumferentially partway around the axis and an attachment feature that extends radially outward from the shroud wall, a carrier segment arranged circumferentially at least partway around the axis and coupled with the blade track segment to support the blade track segment relative to the axis, the carrier segment including an outer wall, a forward support wall that extends radially inward from the outer wall axially forward of the attachment feature, and an aft support wall that extends radially inward from the outer wall axially aft of the attachment feature, and wherein the outer wall of the carrier segment is formed to include a plurality of impingement passageways in fluid communication with a chamber formed radially between the carrier segment and the blade track segment to conduct cooling air through the carrier segment into the chamber, and wherein each impingement passageway of the plurality of impingement passageways has a primary axis extending radially and circumferentially through the outer wall of the carrier segment relative to the axis.

14. The turbine shroud assembly of claim 13, wherein the attachment feature of the blade track segment includes a first attachment flange that extends radially outward from the shroud wall and a second attachment flange spaced apart axially from the first attachment flange that extends radially outward from the should wall, and wherein the carrier segment further includes a first intermediate support wall that extends radially inward from the outer wall of the carrier segment axially aft of the first attachment flange so that the first attachment flange is located axially between the forward support wall and the first intermediate support wall and a second intermediate support wall that extends radially inward from the outer wall of the carrier segment axially forward of the second attachment flange so that the second attachment flange is located axially between the aft support wall and the second intermediate support wall, the second intermediate support wall spaced apart axially from the first intermediate support wall to define a portion of the chamber.

15. The turbine shroud assembly of claim 14, further comprising a first retainer that extends axially into the forward support wall and the aft support wall of the carrier segment and through the first attachment flange and the second attachment flange of the blade track segment so as to couple the blade track segment to the carrier segment, and wherein the plurality of impingement passageways includes a first impingement passageway and a second impingement passageway spaced apart circumferentially from the first impingement passageway so that the first retainer is located circumferentially between the first impingement passageway and the second impingement passageway.

16. The turbine shroud assembly of claim 15, wherein the first impingement passageway extends circumferentially at a first angle relative to an inner surface of the carrier segment and the second impingement passageway extends circumferentially at a second angle relative to the inner surface of the carrier segment, and wherein the second angle is different than the first angle.

17. The turbine shroud assembly of claim 15, further comprising a second retainer that extends axially into the carrier segment and through the first attachment flange and the second attachment flange of the blade track segment, the second retainer spaced apart circumferentially from the first retainer to locate at least one of the plurality of impingement passageways circumferentially between the first retainer and the second retainer.

18. The turbine shroud assembly of claim 17, wherein the plurality of impingement passageways includes a first impingement passageway, a second impingement passageway spaced apart circumferentially from the first impingement passageway so that the first retainer and the second retainer are located circumferentially between the first impingement passageway and the second impingement passageway, a third impingement passageway that extends through the outer wall of the carrier segment circumferentially between the first retainer and the second retainer so that the third impingement passageway is located circumferentially between the first retainer and the second retainer, and a fourth impingement passageway that extends through the outer wall of the carrier segment circumferentially between the first retainer and the second retainer so that the fourth impingement passageway is located circumferentially between the first retainer and the second retainer, the fourth impingement passageway spaced apart circumferentially from the third impingement passageway.

19. The turbine shroud assembly of claim 13, wherein each of the plurality of impingement passageways extends circumferentially at an angle relative to an inner surface of the carrier segment and the angle of at least one impingement passageway of the plurality of impingement passageways is different than the angle of the other impingement passageways of the plurality of impingement passageways.

20. A method comprising providing a blade track segment including a shroud wall shaped to extend partway around an axis, a first attachment flange that extends radially outward from the shroud wall, and a second attachment flange spaced apart axially from the first attachment flange that extends radially outward from the shroud wall, providing a carrier segment including an outer wall, a first support wall that extends radially inward from the outer wall, and a second support wall spaced apart axially from the first support wall that extends radially inward from the outer wall, the outer wall formed to include a plurality of impingement passageways that extend radially and circumferentially through the outer wall of the carrier segment relative to the axis, providing a first retainer, arranging the blade track segment adjacent the carrier segment so that the first attachment flange and the second attachment flange are located axially between the first support wall and the second support wall of the carrier segment, inserting the first retainer through the first support wall, the first attachment flange, the second attachment flange, and the second support wall to couple the blade track segment to the carrier segment, conducting a flow of cooling air through the plurality of impingement passageways into a chamber formed radially between the carrier segment and the blade track segment to cool the blade track segment, diffusing the flow of cooling air as the cooling air is conducted in the chamber to avoid localized high thermal gradient areas on the shroud wall of the blade track segment, wherein each impingement passageway of the plurality of impingement passageways has a primary axis that extends radially and circumferentially through the outer wall of the carrier segment relative to the axis.

\* \* \* \* \*